Feb. 14, 1933.                    R. H. BARBOUR                    1,897,415
                                INDUCTION CONTROLLER
                              Filed April 25, 1931         3 Sheets-Sheet 2

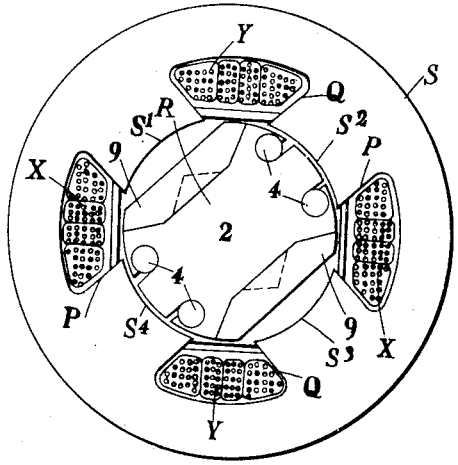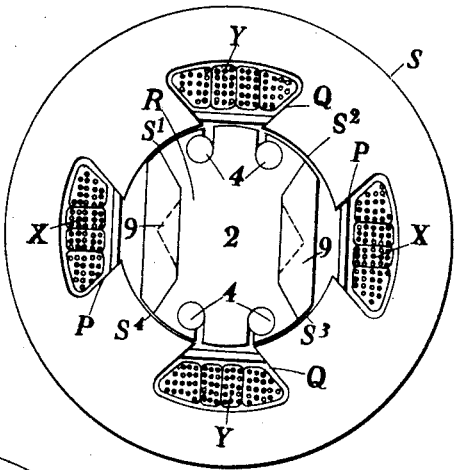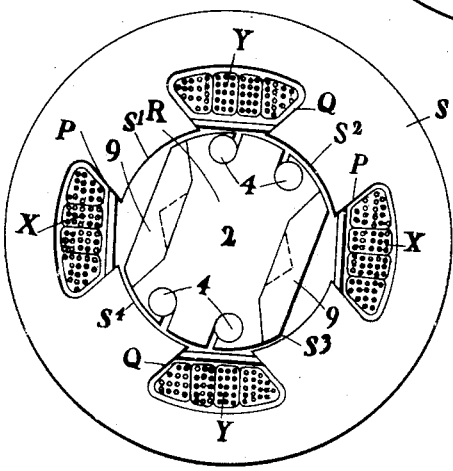

INVENTOR
Ralph Henry Barbour
BY
Gill + Jennings
ATTORNEYS

Feb. 14, 1933.  R. H. BARBOUR  1,897,415
INDUCTION CONTROLLER
Filed April 25, 1931  3 Sheets-Sheet 3
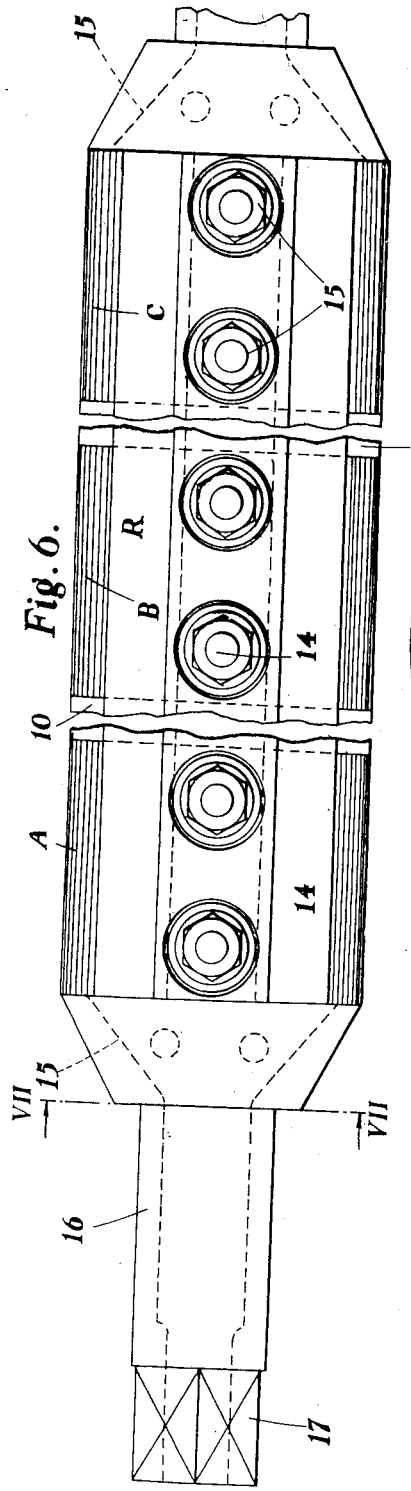
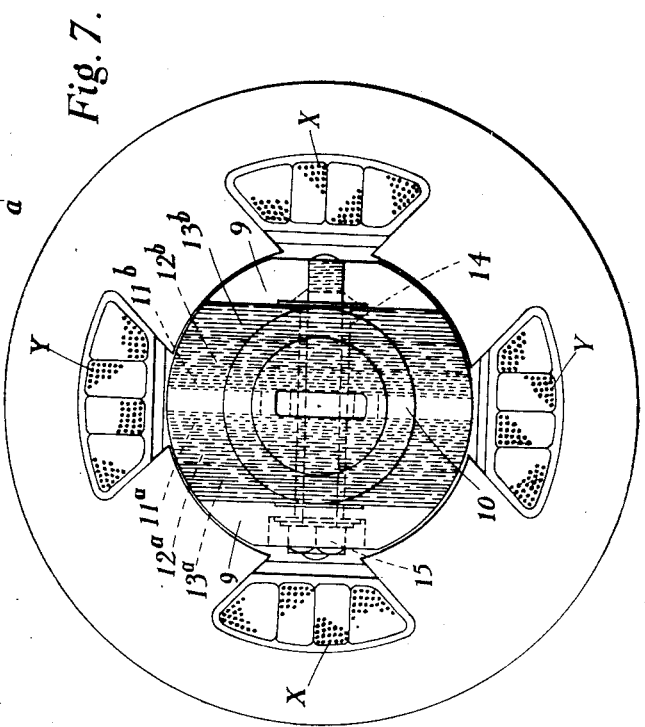
INVENTOR
Ralph Henry Barbour
BY
Gill & Jennings
ATTORNEYS Patented Feb. 14, 1933

1,897,415

UNITED STATES PATENT OFFICE

RALPH HENRY BARBOUR, OF LONDON, ENGLAND

INDUCTION CONTROLLER

Application filed April 25, 1931, Serial No. 532,909, and in Great Britain May 17, 1930.

This invention relates to induction controllers, wherein the electromagnetic relationship betwen stationary primary and secondary windings is varied by moving a magnetic member or rotor. The induction controller may conveniently be provided with a fixed magnetic framework, or yoke, having slots on opposite sides carrying the primary windings, and other slots on opposite sides to one another, but with their axis at an angle, usually 90 degrees, from that of the primary slots, carrying the secondary windings and with a magnetic member rotatable through about 90 degrees, having pole faces which cause the magnetic flux induced by the primary windings to pass through the secondary winding in one or other direction, or intermediately.

According to the present invention, the rotor of the induction controller is arranged to carry conducting members which provide at least two closed paths for electric currents within the magnetic mass of the rotor. These paths are so arranged as to have no magnetic interaction with flux passing directly through the rotor from pole face to pole face parallel to the magnetic axis of the rotor, but to be interlinked with flux passing transversely across the magnetic axis of the rotor. The conductive members may consist of pairs of conducting rods for example of copper, extending along the rotor parallel to its rotational axis and connected together in pairs by bridge pieces at opposite ends of the rotor. However, greater conductivity in the closed or short-circuited paths may be obtained by providing actual plates of conducting material extending along the rotor in planes parallel to that containing the magnetic and rotational axes. It is convenient then for the rotor to have its laminations of magnetic material also extending in planes parallel to that containing the said axes. It is preferred to use a symmetrical arrangement with conductive plates placed on opposite sides of the central plane of the rotor and equally spaced from that plane, and in fact, a satisfactory mechanical construction with a good performance is obtained by having a zone of such plates on opposite sides of the central plane of the rotor. In such a case, each zone may conveniently consist of alternate laminations of copper and magnetic material. Owing to the fact that the conductors are in the form of plates, it is possible to arrange a large number of closed conductive paths for induced currents distributed over a considerable space. All the magnetic laminations are preferably insulated in the usual way by a thin film, as a coating of varnish or thin paper.

The conductive paths permit the flux linked with the primary windings to flow along the rotor without interference, but themselves link with any flux which the secondary windings tend to drive transversely across the rotor, that is to say, not linked with the primary windings. In the neutral position of the rotor, all the flux through the secondary windings is linked with the conductive paths; in the extreme position none is linked with them and in the intermediate positions of the rotor all the flux through the secondary windings which is not linked with the primary windings is linked with some at least of the conductive paths. It will be understood that in the above statement flux leakage, outside the magnetic paths provided has been neglected.

The reason why at least two conductive paths are provided in the rotor is that in the positions between the neutral position and either extreme position, some of the primary flux makes a limited passage transverse to the magnetic axis of the rotor.

Thus, in the novel arrangement according to this invention in every position of the rotor, whatever portion of the flux linked with the secondary winding is not also linked with the primary winding, is linked with sufficient closed conductive paths to reduce the inductance of the secondary winding to a low figure.

A good mechanical structure may be obtained by employing a rigid central steel plate or web to serve as a foundation support for the conducting plates and laminations. This arrangement also has the advantage that it enables end bearings for the rotor spindle to be formed merely by casting sleeves about the ends of the said central plate.

For a three-phase induction controller, groups of laminations are placed in succession along the axis of the rotor, and those associated with each phase are preferably separated from one another.

In order that the invention may be clearly understood and readily carried into effect, particular examples will now be described with reference to the accompanying drawings in which:—

Figures 1, 2 and 3 are merely diagrams, which show the rotor within its stator in three different positions;

Figure 6 is a side elevation of an alternative form of rotor; and

Figure 7 is an end elevation, with the rotor in the neutral position within the stator, the rotor being shown in section on the line VII—VII in Figure 6.

In Figures 1, 2 and 3 the stator S is shown built up of magnetic stampings and has four pole pieces $S^1$, $S^2$, $S^3$, $S^4$. The primary winding X is carried in diametrically opposite slots P between the pole pieces, and the secondary winding Y is placed at right angles to it in the slots Q.

In Figure 1 the rotor R is shown so that its pole faces lie substantially opposite the poles $S^2$ and $S^4$. In this position, the primary and secondary windings are fully interlinked, all flux (other than leakage outside the provided magnetic paths) passing through one also passing through the other from the pole $S^2$ to the pole $S^4$. The conductive rings have no effect on this flux.

In Figure 2 the rotor R is shown in the neutral position. The primary and secondary windings are not interlinked. The primary flux has unimpeded paths through the rotor from poles $S^1$ to $S^4$ and from poles $S^2$ to $S^3$, while all the secondary flux is intercepted by both the closed circuits through the rotor conductors 4. In the position shown in Figure 3 there are unimpeded paths through the rotor for the primary flux from poles $S^1$ to $S^4$, $S^2$ to $S^4$ and $S^2$ to $S^3$ while secondary flux from $S^1$ to $S^2$ and from $S^4$ to $S^3$ is intercepted by one or other of the closed circuits in the conductors 4, and secondary flux from $S^4$ to $S^2$ is linked with the primary. The path between $S^4$ and $S^2$ is to a limited extent transverse to the rotor's magnetic axis. It will be noted that when the rotor is moving from the position shown in Figure 2 to that shown in Figure 3, the two paths along the edges of the rotor are ceasing to be effective while the path down the middle of the rotor is becoming more effective. Most flux passes down the middle of the rotor in the position shown in Figure 1.

Figure 4:
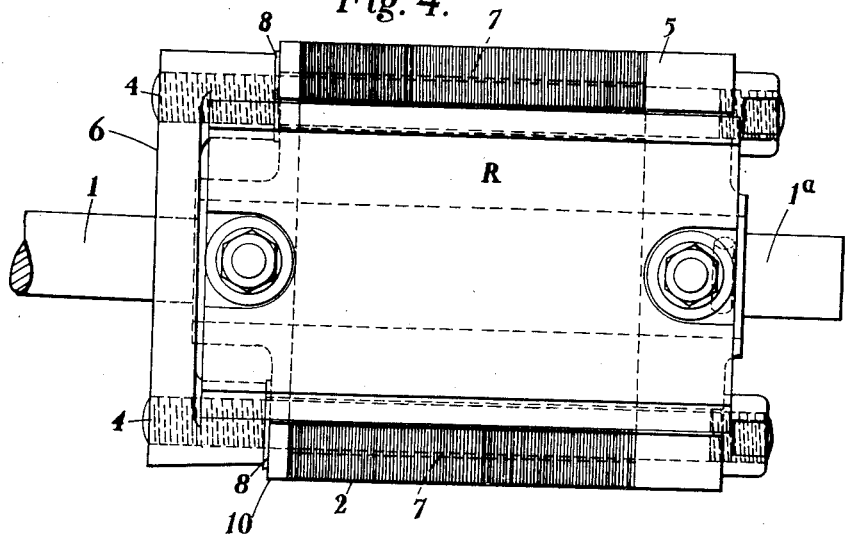
Figure 4 is a side elevation of one form of rotor constructed in accordance with the invention.
Figure 5:
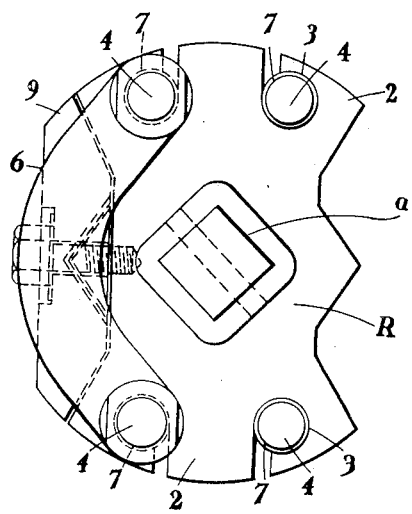
Figure 5 is an end elevation of the rotor from the left of Figure 4 with certain parts removed.

Referring to Figures 4 and 5, the induction controller spindle 1 is shown square at one end at 1a so that a handle may be attached for rotating the rotor. This spindle carries the rotor assembly comprising soft iron transverse stampings 2 provided with slots 3 to receive four copper conducting rods 4. At one end of the rotor a copper plate 5 unites the ends of all four of the copper rods, while at the opposite end of the rotor two bridge pieces 6, only one of which is shown in the drawings, serve to connect the rods 4 in pairs. Insulating sleeves 7 surround the rods 4 and mica washers 8 insulate the bridge pieces 6 from casting 10 (which assists to hold firmly the stampings 2) in order to avoid the formation of closed circuits through the undesired pairs of rods 4. The result is that there is one closed circuit on one side of the rotor's magnetic axis through upper and lower rods 4 through the bridge pieces 6 at one end of the rotor and the plate 5 at the opposite end. There is a similar closed circuit at the opposite side of the magnetic axis of the rotor.

The construction may be slightly modified by replacing the plate 5 by a pair of bridge pieces similar to those shown at 6 and insulated by mica washers such as 8. It is preferred for the conducting rods 4 to be placed at about a third or a quarter of the width of the rotor from the edge of the rotor. The stampings are recessed on either side to receive a copper plate 9. These copper plates 9 help to reduce leakage of flux outside the provided magnetic paths and are particularly useful in the position shown in Figure 1 when they are located immediately opposite the stator poles $S^1$, $S^3$. In this position, the primary and secondary windings are both magnetizing the poles $S^1$ and $S^3$ in the same sense and a strong field would be set up but is restrained by currents induced in the plates 9. Thus the currents induced in the plates 9 oppose the magnetizing effect of the stator windings whereby the self-inductance of the latter is reduced.

In the form of construction shown in Figures 6 and 7, the rotor R is built up about a thick central steel plate 10 running along the rotational axis. In the particular construction shown in these figures there is on either side of the plate 10 a layer 11a and 11b of magnetic laminations, for example of soft iron. These are followed by a zone 12a, 12b on each side consisting of laminations which are alternately of copper and of the magnetic material. Again this is followed by a layer 13a, 13b of the magnetic plates and finally, the rotor is finished by providing two thick copper plates 9 which serve the same purpose as the copper plates 9 in Figures 1 to 5. The whole rotor assembly is mechanically clamped together by insulated transverse bolts 14 and nuts 15 which hold the whole rotor R together as a rigid structure. As seen in Figure 6 the rotor is arranged for a three-phase induction controller with three groups of stampings seen at A, B, C, and with two assembly bolts 14 per phase.

For the purpose of mounting and rotation, the central steel plate 10 is tapered down in width towards the ends at 15 and gun metal bearing sleeves 16 are cast on the ends. The extreme end of one of the sleeves 16 may be square as shown at 17 or otherwise formed to receive a handle or the like for rotating the rotor R of the controller.

The stator is shown in Figure 7 of a similar construction to that shown in Figures 3 to 5, the primary winding being shown at X and the secondary winding at Y.

I claim:—

1. Induction controller apparatus, comprising in combination, a stationary magnetic structure, primary and secondary windings mounted thereon and a magnetic rotor mounted for movement relatively to said windings, said rotor including a plurality of low resistance paths for electric currents arranged so that magnetic flux linked with said secondary winding is linked either with said primary winding or with said closed paths.

2. Induction controller apparatus, comprising in combination, a stationary magnetic structure, primary and secondary windings mounted thereon, a magnetic rotor mounted for movement relatively to said windings, a plurality of pairs of conducting rods carried by said rotor and extending axially thereof and conducting bridge pieces located at opposite ends of said rotor and connecting together said rods in pairs.

3. Induction controller apparatus, comprising in combination, a stationary magnetic structure, primary and secondary windings mounted thereon, a magnetic rotor mounted for movement relatively to said windings and a plurality of conductors each constituted by a plate of electrically conducting material carried by said rotor, extending parallel to the magnetic axis and the axis of rotation thereof and arranged so that magnetic flux linked with said secondary winding is linked either with said primary winding or with said conductors.

4. Induction controller apparatus, comprising in combination, a stationary magnetic structure, primary and secondary windings mounted thereon and a magnetic rotor mounted for movement relatively to said windings and including a set of laminations of magnetic material extending axially of said rotor.

5. Induction controller apparatus, comprising in combination a stationary magnetic structure, primary and secondary windings mounted thereon, a magnetic rotor mounted for movement relatively to said windings and including a set of laminations of magnetic material extending axially of said rotor and a plurality of plates of conducting material carried by said rotor, extending axially thereof and interposed between said laminations.

6. A rotor for induction controller apparatus, comprising in combination, a rigid central steel web having its ends shaped to form bearing journals, a pair of magnetic masses secured to said web on opposite sides thereof and plates of electrically conductive material incorporated in said magnetic masses.

7. A rotor for induction controller apparatus, comprising in combination, a rigid central steel web reduced in width at both ends, a pair of magnetic masses secured to said web on opposite sides thereof and a plurality of plates of electrically conductive material incorporated in said magnetic masses.

8. A rotor for induction controller apparatus, comprising in combination, a rigid central steel web, a plurality of axially arranged plates secured to the said web on opposite sides thereof and sleeves cast about the ends of said web to form bearing journals for said rotor.

9. A removable magnetic member for induction controller apparatus, comprising in combination, a magnetic mass, and groups of plates of electrically conductive material embodied within said magnetic mass mounted with the planes of all said plates parallel to one another and symmetrically on opposite sides of the central plane of the movable magnetic member.

10. A rotor for induction controller apparatus, comprising in combination a magnetic mass and a plurality of zones of plates extending axially along and parallel to the central plane of the magnetic member, each of said zones consisting of alternate plates of electrically conductive material and of magnetic material.

11. A rotor for induction controller apparatus, comprising in combination, a magnetic mass and a plurality of zones of axial plates, said plates being parallel with one another and with the central plane of the rotor and each of said zones consisting of alternate plates of copper and of magnetic material.

In witness whereof I hereunto subscribe my name this 16th day of April, 1931.

RALPH HENRY BARBOUR.